No. 777,842. PATENTED DEC. 20, 1904.
H. J. CORDLE.
PLANTER.
APPLICATION FILED DEC. 1, 1903.
NO MODEL. 3 SHEETS—SHEET 3.
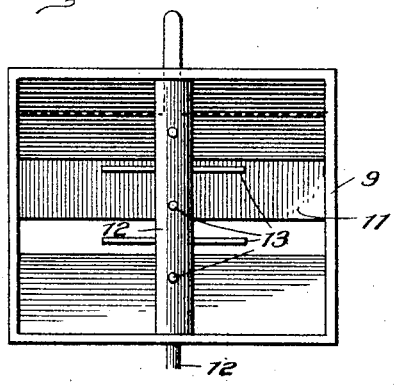
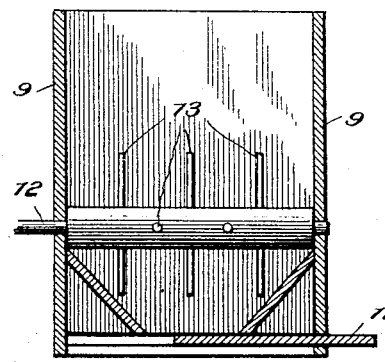
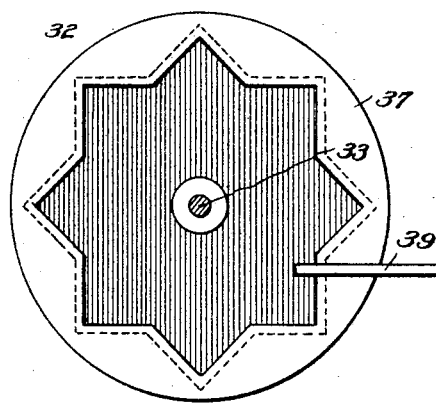
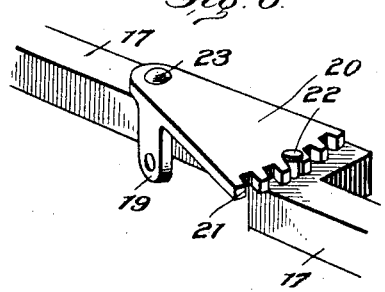
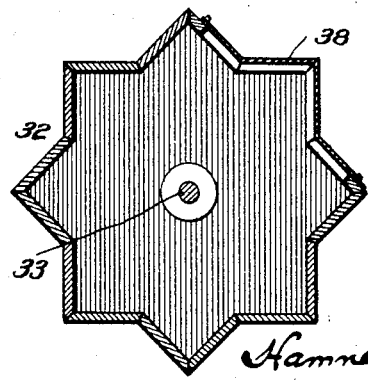
Witnesses
Edwin L. Bradford
Inventor
Hamner J. Cordle
By Newsey Laugh
Attorneys No. 777,842.

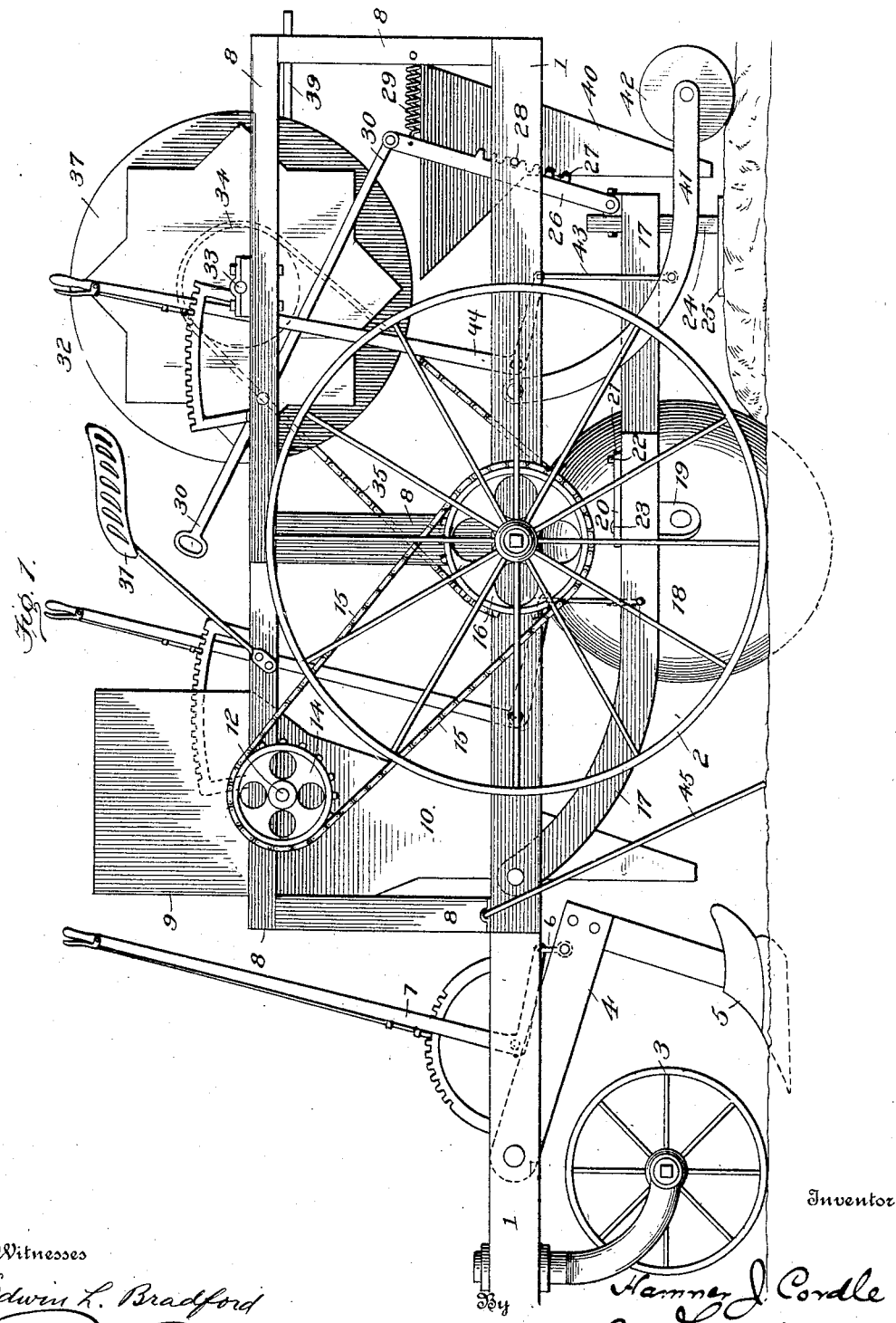

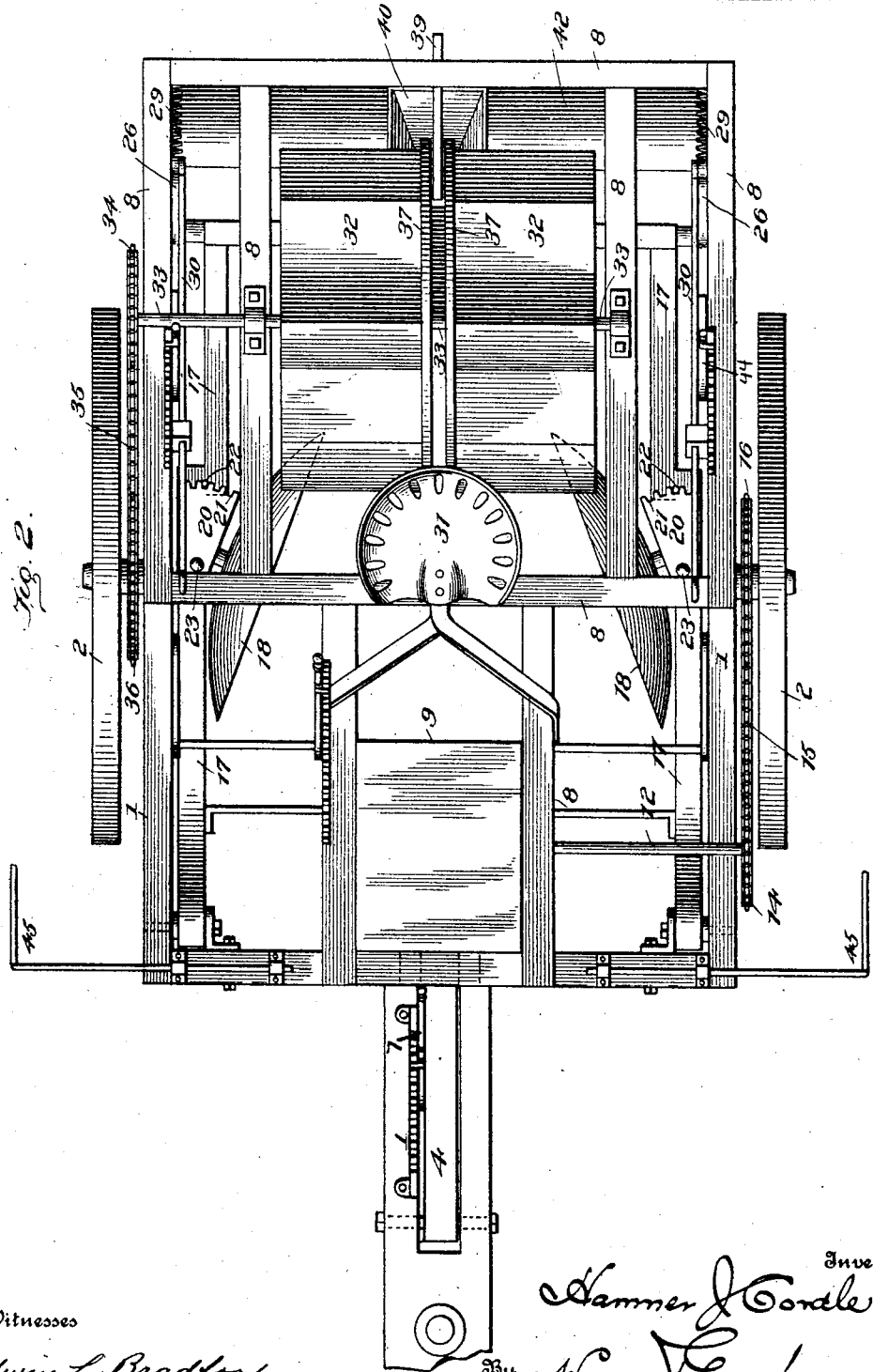

Patented December 20, 1904.

UNITED STATES PATENT OFFICE.

HAMNER J. CORDLE, OF LITTLETON, NORTH CAROLINA.

PLANTER.

SPECIFICATION forming part of Letters Patent No. 777,842, dated December 20, 1904.

Application filed December 1, 1903. Serial No. 183,359.

*To all whom it may concern:*

Be it known that I, HAMNER J. CORDLE, a citizen of the United States, residing at Littleton, in the county of Halifax and State of North Carolina, have invented certain new and useful Improvements in Planters, of which the following is a specification, reference being had to the accompanying drawings.

This invention has relation to planters; and it consists in the novel construction and arrangement of its parts, as hereinafter shown and described.

The object of the invention is to provide a planter consisting of a framework mounted upon wheels and having located at its forward end a pivoted plow with a lever for operating the same, said plow being adapted to open a furrow. A fertilizer-dropper is located upon the framework and is adapted to deposit fertilizer in the furrow made by the said plow. A second framework is pivoted to the first said framework, and disks are carried by said second frame. A means is provided whereby the angle of said disks may be adjusted with relation to the line of draft. Said disks are adapted to list the earth over the fertilizer deposited in the furrow made by the fall of the plow. Said second frame is also provided with a seed-furrow opener, which is located behind said disks. A seed-dropper is carried by the framework of the device and is adapted to deposit seed in the furrow made by said opener. A coverer is attached to the framework and is adapted to cover the seed so deposited.

In the accompanying drawings, Figure 1 is a side elevation of the planter. Fig. 2 is a top plan view of the same. Fig. 3 is a bottom view of the fertilizer-dropper, showing a means for regulating the flow of the fertilizer. Fig. 4 is a transverse sectional view of said fertilizer-dropper. Fig. 5 is an end view of one of the halves of the seed-dropper. Fig. 6 is a perspective view showing the means for adjusting the angle of the disk with relation to the line of draft; and Fig. 7 is a sectional view of a portion of one of the halves of the seed-dropper, showing the same provided with a hinged door or section.

The frame 1 is mounted upon the wheels 2 2 and is supported at its forward portion by the caster-wheel 3. The forward end of the beam 4 is pivoted to the forward portion of the frame 1 and the plow 5 is carried by said beam. The link 6 is connected at its lower end to the beam 4 and at its upper end to the lower end of the lever 7. The superstructure 8 is mounted upon the frame 1, and the fertilizer-hopper 9 is located at or near the forward end of said superstructure. The chute 10 depends from said hopper 9 and terminates behind the plow 5. Said hopper 9 is constructed substantially as shown in Figs. 3 and 4, the bottom of said hopper being provided with an adjustable slide 11, by the manipulation of which the flow of fertilizer from the hopper may be regulated. The horizontal shaft 12 is journaled in said hopper and is provided with suitable stirrers 13. The sprocket-wheel 14 is fixed to the end of said shaft 12, and the sprocket-chain 15 surrounds the said wheel 14 and also the sprocket-wheel 16, rigidly attached to the hub of one of the supporting-wheels 2. The open frame 17 is pivoted at its forward end to the frame 1. Said frame 17 carries the listing-disks 18 18. These disks are journaled to the lugs 19 of the plate 20, each of said plates being provided with the segment of teeth 21. The pin 22 is adapted to enter at its lower end a socket in the frame 17 and passes up in the space between the teeth 21. As the said plate 20 is pivoted at the point 23 to the frame 17, it is obvious that the said plate 20 may be swung horizontally on the pivotal point 23 and the angle of the disks 18 with relation to the line of draft may be varied. The rear end of the frame 17 is provided with a standard 24, to the lower end of which is attached the wedge-shaped seed-furrow opener 25.

The bar 26 is pivoted at its lower end to the rear end of the frame 17, said bar being provided with suitable teeth 27, which are adapted to engage a horizontal pin 28, carried by the frame 1. The spring 29 is attached at one end of the bar 26 and at its other end to the superstructure 8 of the said frame 1. The tension of said spring 29 has a tendency to maintain the teeth 27 in engagement with the pin 28. The rod 30 is pivoted at its rear end to the upper end of the bar 26 and extends at its forward end to the vicinity of the driver's seat 31.

The seed-dropper 32 is made in the form of a barrel consisting of two halves spaced apart at their inner edges. The shaft 33 supports the said seed-dropper 32 and is journaled in the superstructure 8. The sprocket-wheel 34 is fixed to the end of the said shaft and is surrounded by the sprocket-chain 35, which also surrounds the sprocket-wheel 36, attached to the hub of one of the supporting-wheels 2. Each of the halves constituting the dropper 32 is made substantially star shape in cross-section, and each half is provided with the annular flange 37, located at its inner end. One of the halves of the said dropper 32 is provided with a hinged door 38, which conforms in shape to the substantially star shape of the said half. Through this door the seed is introduced into the hopper. The finger 39 enters the space between the inner edges of the halves constituting the dropper 32, said finger 39 being supported by the superstructure 8. Below the said dropper 32 is located a chute 40, which terminates at its lower end just behind the seed-furrow opener 25. The arms or bars 41 are pivoted at their forward ends to the frame 1, and the roller 42 is journaled between the rear ends of said arms, said roller being located behind the said chute 40. The link 43 is pivoted at its lower end to one of the arms 41 and at its upper end to the lower end of the lever 44, the upper end of said lever extending within operating distance of the driver's seat 31.

The operation of the device is as follows: Fertilizer having been placed in the hopper 9 and seed—such as cotton, corn, or peanuts—in the dropper 32, the planter is drawn over the ground. The plow 5 opens a furrow into which fertilizer from the hopper 9 is deposited through the chute 10. The disks 18 list the earth over the said fertilizer, and the opener 25 opens a seed-furrow in the listed earth. The seed passes from the dropper 32 (as will be hereinafter described) through the chute 40 into the furrow behind the opener 25. The roller 42 then covers the said seed with earth. It will thus be seen that the fertilizer is below the seed, but the seed does not come in direct contact with the same. As the wheels 2 rotate, rotary motion is conveyed to the dropper 32, which rotates in unison with the shaft 33. The seed being located in the interior of the said dropper 32, as the said dropper rotates the seed comes in contact with the finger 39, which forces the said seed out through the space between the inner ends of the halves constituting the dropper 32 and the said seed falls into the upper end of the chute 40. The peculiar shape of the halves constituting the dropper 32 facilitates the extraction of the seed therefrom. This is especially advantageous in the planting of cotton, owing to the linty nature of this seed.

Having thus described my invention, what I claim as new, and desire to secure by Letters Patent, is—

1. A planter consisting of a frame mounted upon wheels, a plow pivoted to the forward end of said frame, a fertilizer-dropper having an outlet located behind said plow, a frame pivoted to the first said frame and carrying disks located behind the outlet of said fertilizer-dropper, a seed-furrow opener located behind said disks, a seed-dropper adapted to deposit seed in the furrow made by said opener and a coverer pivotally attached to the first said frame but independent of the second said frame and adapted to cover the seed in said furrow.

2. A planter consisting of a frame mounted upon wheels, a plow attached to the forward end of said frame, a fertilizer-dropper having an outlet behind said plow, a second frame pivoted to the first said frame and carrying listers which are located behind said fertilizer-dropper, a seed-furrow opener carried by said second frame and located behind said listers and adapted to move vertically with the same, a dropper adapted to deposit seed in the furrow made by said opener and a coverer pivotally attached to the first said frame, but independent of the second said frame.

In testimony whereof I affix my signature in the presence of two witnesses.

HAMNER J. CORDLE.

Witnesses:
  EARLE S. PRINCE,
  MARY L. MILLARD.